United States Patent

Akiyama et al.

[11] Patent Number: 5,891,340
[45] Date of Patent: Apr. 6, 1999

[54] METHOD OF COOLING FILTRATION APPARATUS AFTER STEAM STERILIZATION

[75] Inventors: Takashi Akiyama; Shinichi Chikura, both of Osaka, Japan

[73] Assignee: Nitto Denko Corporation, Osaka, Japan

[21] Appl. No.: 778,736

[22] Filed: Jan. 2, 1997

[51] Int. Cl.⁶ ................................................ B01D 65/02
[52] U.S. Cl. .................... 210/636; 210/321.69; 422/1; 422/11; 422/26
[58] Field of Search .................... 210/636, 637, 210/321.69, 500.23; 422/1, 11, 26

[56] References Cited

U.S. PATENT DOCUMENTS 4,810,469  3/1989  Masuhara ................................. 422/26
4,840,769  6/1989  Nejigaki et al. ........................ 210/636
5,268,144  12/1993 Heilmann et al. ....................... 422/26

FOREIGN PATENT DOCUMENTS 61-242605  10/1986  Japan .
63-190605  8/1988   Japan .
2-207826   8/1990   Japan .

*Primary Examiner*—John Kim
*Attorney, Agent, or Firm*—Sughrue, Mion, Zinn, Macpeak & Seas, PLLC

[57] ABSTRACT

Filtration of raw water by a filtration apparatus in which a membrane module is incorporated is sLopped, and sterilization is performed for a predetermined time period by supplying steam to the filtration apparatus. Thereafter, the raw water at an ordinary temperature is passed through the filtration apparatus at a linear velocity of 0.1. m/sec. or less, so as to cool the filtration apparatus.

5 Claims, 2 Drawing Sheets

METHOD OF COOLING FILTRATION APPARATUS AFTER STEAM STERILIZATION

BACKGROUND OF THE INVENTION

1. Field of the Invention

The invention relates to a method of cooling a filtration apparatus immediately after the filtration apparatus is subjected to steam sterilization.

2. Description of the Related Art

A filtration apparatus is used for producing extrapure water useful as water for medicine, water for a hospital, water for electronic industries, or the like. Such a filtration apparatus is required to be periodically subjected to sterilization.

However, heat-resistant spores cannot be sufficiently sterilized by-hot water, so that steam sterilization is often required.

The steam sterilization is performed in the following manner. Steam (gage pressure: 1 kg/cm$^2$, and 120° C.) is continuously sent for a predetermined time period to the raw-water side of a filtration apparatus (the steam is continuously sent while condensed water is discharged from a steam trap). After the steam sterilization, a valve disposed immediately upstream from the steam trap is closed, and the filtration apparatus is isolated from the outside. Then, the residual steam in the apparatus is cooled. During the cooling, the residual steam is condensed and the internal pressure of the filtration apparatus becomes negative. This produces a fear that outside air may enter the apparatus and, because of the entry of the outside air, the interior of the filtration apparatus, or the filtrated-water side of a membrane module which is incorporated in the apparatus may be possibly contaminated. In order to prevent such contamination from occurring, the following methods have been proposed. A sterilized gas is introduced to the filtrated-water side immediately after the sending of steam is stopped, and the residual steam is cooled under the pressure of the introduced gas (Japanese Patent Publication No. Sho. 61-268303). Similarly, immediately after the stop of the sending of steam, hot water is introduced to the raw-water side and the residual steam is cooled together with the introduced hot water (Japanese Patent Publication No. Sho. 61-268303).

In the former method, however, it is necessary to provide sterilization equipment for the introduced gas and the introducing piping. In the latter method, it is necessary to provide hot-water producing equipment. In both of the methods, an increase of the equipment cost of a filtration apparatus, an increase of an installation space, and the like cannot be avoided. In the latter method, particularly, a huge amount of energy is consumed.

In order to eliminate the above-mentioned disadvantages of the cooling methods, the following method has been proposed (Japanese Patent Publication No. Sho. 63-190605). Immediately after the stop of the sending of steam, air is introduced from the raw-water side under pressure, and the filtrated-water side of the membrane module is filled with the air transmitted through the membrane (during the transmission through the membrane, sterilization is realized). Under the air-filled condition, cooling is attained to some extent, and residual steam is condensed. Because of the condensation, the pressure reduced. However, the pressure is prevented from becoming negative by means of the pressure of the air. In tilts way, the cooling is performed to some temperature. Then, raw water of an ordinary temperature is introduced into the filtration apparatus, and the final cooling is performed.

However, the method in which air is supplied under pressure and then raw water of an ordinary temperature is introduced involves the following drawbacks. Tale cooling is performed while a filtrated-water chamber of the membrane module is filled with the air. In addition, the filtrated water of the supplied raw water of an ordinary temperature is not caused to flow in the filtrated-water chamber. Therefore, the cooling rate on the filtrated-water chamber side of the membrane module is low and a condition in which the temperature of the filtrated-water chamber of the membrane module is largely different from that of the outer surface of the membrane module and that of the piping (a difference of about 20° to 40° C.) continues for a long time. It takes a long time to eliminate the difference (i.e., to perfectly cool the filtrated-water chamber side of the membrane module). When the membrane module starts to operate again before the finish of the cooling, and raw water is caused to flow under steady conditions, the membrane module may be easily damaged by a thermal stress.

For example, a membrane module may be configured so that a hollow fiber membrane flux is accommodated in a cylindrical cover, gaps between both inner ends of the cover and the hollow fiber membrane are sealed with an adhesive such as an epoxy resin, the interior of the hollow fiber membrane is used as a raw-water chamber, and the space between the hollow fiber membrane and the inner circumference of the cover is used as a filtrated-water chamber. In the membrane module, peeling due to a thermal stress easily occurs between the cover and the adhesive portion.

SUMMARY OF THE INVENTION

It is an object of the invention to provide a method wherein sterilization is performed by sending steam to a raw-water side of a filtration apparatus in which a membrane module is incorporated, the membrane module is then rapidly cooled to an ordinary temperature only by passing raw water of an ordinary temperature, while preventing a negative pressure from being generated on the filtrated-water side, and preventing peeling due to a thermal stress from occurring in an adhesion interface of the hollow fiber membrane module, thereby enabling a steady operation of the filtration apparatus Lo be early restarted.

According to the present invention, there is provided a method of cooling a filtration apparatus after steam sterilization, comprising the steps of: filtrating raw water by the filtration apparatus in which a membrane module is incorporated; sending steam into the filtration apparatus to sterilize thereof; and passing the raw water of an ordinary temperature at a lower linear velocity than a linear velocity in the filtration step through the filtration apparatus so as to cool thereof.

In the above method, the lower linear velocity of the filtrated raw water is preferably set to 0.1 m/sec. or less.

DETAILED DESCRIPTION OF THE PREFERRED EMBODIMENT

Hereinafter, the configuration of the invention will be described with reference to the accompanying drawings.

Figure 1:
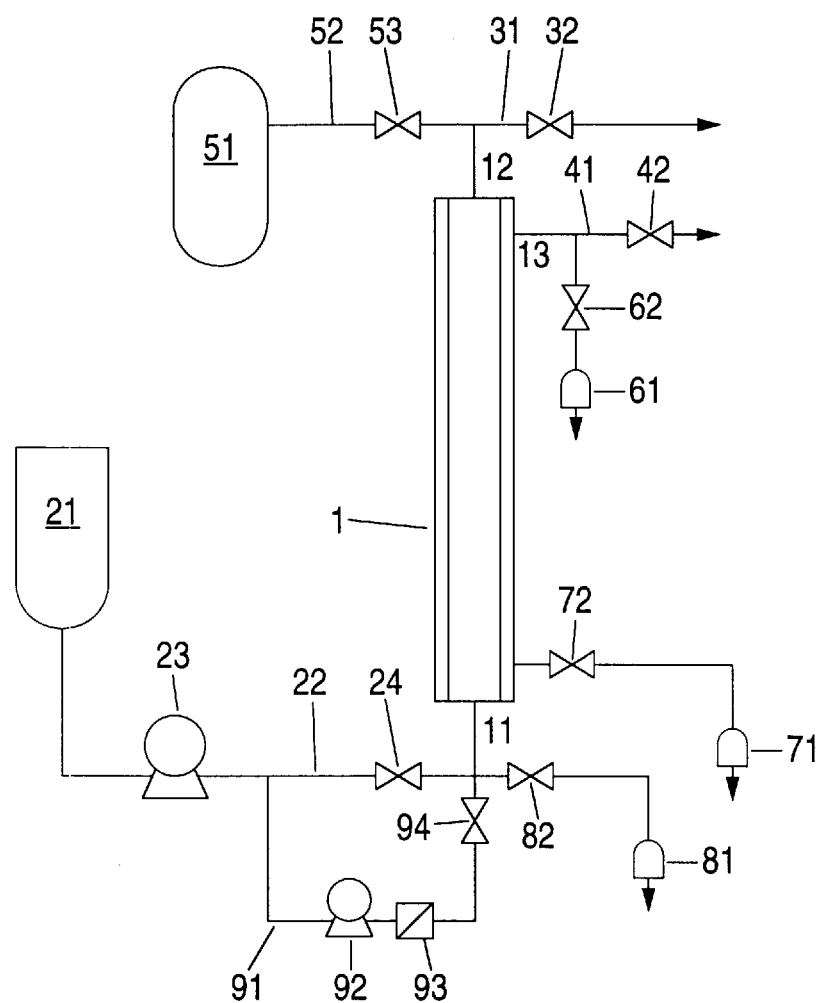
FIG. 1 is a diagram showing a filtration apparatus used in the invention.

FIG. 1 shows a filtration apparatus for producing extra-pure water. Equipment for performing steam sterilization and a circuit for supplying raw water of an ordinary temperature at a lower velocity are added to the filtration apparatus.

In FIG. 1, 1 designates a membrane module. In the membrane module, a hollow fiber membrane flux is accommodated in a cylindrical cover. Gaps between both inner ends of the cover and the hollow fiber membrane are sealed with an adhesive such as an epoxy resin. The interior of the hollow fiber membrane is used as a raw-water chamber, and a space between the hollow fiber membrane and the inner circumference of the cover is used as a filtrated-water chamber. The membrane module is substantially vertically disposed. The reference numeral 11 designates a raw-water inlet of the membrane module, 12 designates a condensed-water outlet, and 13 designates a filtrated-water outlet which is communicated with the upper end of the filtrated-water chamber of the membrane module. The reference numeral 21 designates a raw-water storage tank, 22 designates a main raw-water supplying pipe, 23 designates a main raw-water supplying pump, and 24 designates a main raw-water supplying valve. The reference numeral 31 designates a condensed-water discharging pipe, and 32 designates a condensed-water discharging valve. The reference numeral 41 designates a filtrated-water output pipe, and 42 designates a filtrated-water output valve.

The reference numeral 51 designates a steam source, 52 designates a steam supplying pipe, and 53 designates a steam supplying valve. The steam supplying pipe 52 is connected to the condensed-water outlet 12. The reference numeral 61 designates a filtrated-water outlet-side steam trap which is disposed immediately upstream from the filtrated-water outlet valve 42, 62 designates an open/close valve, 71 designates a filtrated-water chamber lower-end steam trap which is attached to the lower end of the filtrated-water chamber of the membrane module 1, 72 designates an open/close valve, 81 designates a raw-water inlet-side steam trap which is attached to the raw-water inlet 11 of the membrane module 1, and 82 designates an open/close valve. Each steam trap may be of the float type. The reference numeral 91 designates a raw-water low-velocity supplying pipe, 92 designates a raw-water low-velocity supplying pump, 93 designates a flow meter, and 94 designates a raw-water low-velocity supplying valve.

In the filtration apparatus, a steady filtration operation is performed in the following manner.

The steam supplying valve 53, the open/close valve 62 of the filtrated-water outlet steam trap 61, the open/close valve 72 of the filtrated-water chamber lower-end steam trap 71, the open/close valve 82 of the raw-water inlet steam trap 81, and the raw-water low-velocity supplying valve 94 are closed. The main raw-water supplying valve 24, the condensed-water discharging valve 32, and the filtrated-water outlet valve 42 are opened. The main-raw-water supplying pump 23 is operated so that raw water in the raw-water storage tank 21 is supplied into the hollow fiber membrane of the membrane module 1 at a predetermined pressure. Filtrated water transmitted through the hollow fiber membrane is then supplied to a predetermined use point via the filtrated-water output pipe 41, and condensed raw water which is not transmitted is discharged through the condensed-raw-water discharging pipe 31.

In addition to the above-mentioned steady filtration operation, steam sterilization is periodically performed in the following procedure.

The main raw-water supplying valve 24, the raw-water low-velocity supplying valve 94, the condensed-water discharging valve 32, and the filtrated-water outlet valve 42 are closed. The open/close valve 62 of the filtrated-water outlet steam trap 61, the open/close valve 72 of the filtrated-water chamber lower-end steam trap 71, and the open/close valve 82 of the raw-water inlet steam trap 81 are opened. Then, the steam supplying valve 53 is opened so that steam is supplied from the steam source 51 to the raw-water side of the membrane module 1. When the filtration operation is stopped, raw water and filtrated water remain in the membrane module 1. Since the open/close valve 82 disposed upstream from the raw-water inlet-side steam trap 81 is opened, the residual raw water comes into contact with a float of the raw-water inlet steam trap 81, and the float floats. Consequently, the steam trap 81. is set into an open state-so that the residual raw water is discharged. The open/close valve 72 disposed upstream from the filtrated-water chamber lower-end steam trap 71, and the open/close valve 62 disposed upstream from the filtrated-water outlet steam trap 61 are opened so that the residual filtrated water comes into contact with floats of the steam traps 71 and 61 and the floats float. As a result, the steam traps 71 and 61 are set into an open state so that the residual filtrated water is discharged. However, as far as the residual raw water and the residual filtrated water exist in the membrane module, the raw-water inlet steam trap 81 and at least the filtrated-water chamber lower-end steam trap 71 are in the open states. These states continue until the membrane module 1 is filled with steam. Thereafter, the interior of the membrane module 1 is replaced by steam, and the membrane module 1 is filled with the steam.

Then, the steam applies heat to the membrane module 1. As the heating of the membrane module 1 proceeds, the supplied steam is condensed as a result of heat radiation. The condensed water is discharged mainly from the raw-water inlet steam trap 81 and the filtrated-water chamber lower-end steam trap 71 among the steam traps. In order to compensate for the discharged water, steam is further supplied from the steam source 51. By the sequential supply of steam, heat is applied to the interior of the membrane module, and the sterilization progresses.

The supply of steam is continuously performed for a predetermined time period and the steam sterilization is then terminated. Thereafter, the filtration apparatus is cooled by the method of the invention.

When the cooling is to be performed, the raw-water supplying valve 24, the open/close valve 82 disposed upstream from the raw-water inlet steam trap 81, the open/close valve 72 disposed upstream from the filtrated-water chamber lower-end steam trap 71, the filtrated-water outlet valve 42, and the steam supplying valve 53 are closed, and both the condensed water discharging valve 32 and the open/close vale 62 disposed upstream from the filtrated-water outlet steam trap 61 are opened. In addition, the raw-water low-velocity supplying valve 94 is opened. Then, the low-velocity supplying pump 92 is operated so that the raw water of an ordinary temperature in the raw-water storage tank 21 is supplied to the membrane module 1 at a lower flow velocity than that of the raw water in the steady filtration. In an initial stage of cooling, the steam which remains in the filtrated-water chamber of the membrane module comes into contact with the filtrated water which is substantially at the ordinary temperature and transmitted through the membrane, so that the steam is condensed. The pressure reduction of the interior of the filtrated-water chamber due to the condensation is compensated by the space reduction of the filtrated-water chamber which is caused by the filtrated water transmitted through the membrane. Therefore, the filtrated water is caused to flow into the filtrated-water chamber of the membrane module without generating a negative pressure therein.

When the flow of the filtrated water further progresses and the filtrated-water chamber of the membrane module 1 is filled with the filtrated water, the float of the filtrated-water outlet steam trap 61 is immersed in the filtrated water so as to float. Accordingly, the steam trap 61 is set into the open state and the filtrated water is caused to flow out. As a result, the flow of the filtrated water in the filtrated-water chamber of the membrane module 1 is produced. Thereafter, as far as the supply of the raw water to the membrane module 1 is continued, the flow of the filtrated water from the filtrated-water outlet steam trap 61 is not stopped. In this way, the membrane module 1 can be cooled while the outside air is avoided from entering.

In the above-mentioned operations, if the flow velocity of the filtrated water from the filtrated-water outlet steam trap 61 is set to be too high, the flow velocity of the filtrated water in the filtrated-water chamber of the membrane module 1 is also high. This makes the cooling rate in the filtrated-water chamber in the membrane module 1 to be too high, and the thermal stress which acts on the interface between the cover of the membrane module 1 and the adhesive becomes excessively large, with the result that peeling occurs in the interface. By contrast, in the invention, the linear velocity of the raw water in the membrane module 1 is set to be as low as 0.1 m/sec. or less. Accordingly, the flow velocity of the filtrated water in the filtrated-water clamber of the membrane module 1 can be sufficiently suppressed, and the filtrated-water chamber of the membrane module 1 can be gradually cooled. As seen from the test results of the embodiments described below, the peeling of the interface of the membrane module 1 can be effectively prevented. It is a mater of course that, as compared with a case where the flow velocity of the filtrated water is zero, the cooling can be finished earlier and the steady-filtration can be restarted sufficiently earlier.

As the membrane module, a hollow fiber membrane module was used in which the membrane is an ultrafiltration membrane made of polysulfone and has an area of 6.3 m² and an adhesive is an epoxy resin. A strain gauge was mounted so as to measure a stress on a cover portion and that on the interface between a hollow fiber membrane filled portion and an outer circumference of the adhesive portion.

Figure 2:
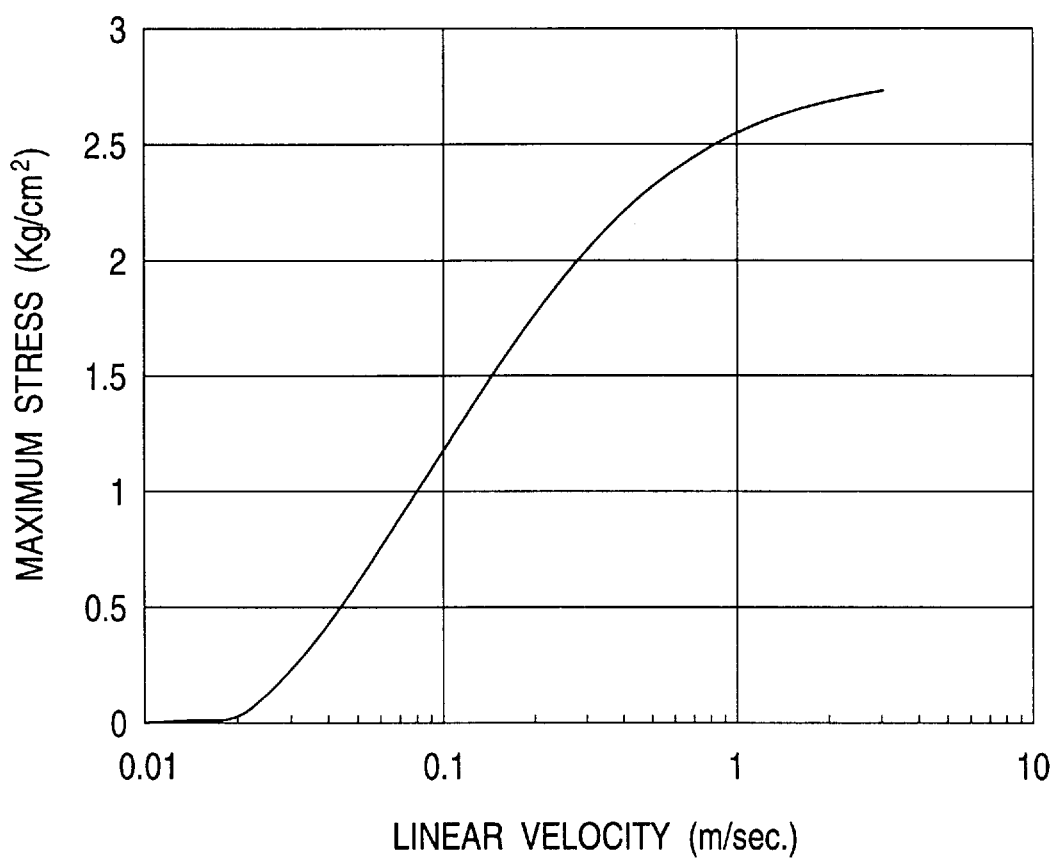
FIG. 2 is a graph showing measured results of the maximum stress on an interface between an adhesive portion of a membrane module and a cover with respect to the linear velocity of transmitted water of an ordinary temperature, according to the invention.

After steam sterilization, raw water of an ordinary temperature was supplied at various linear velocities. The maximum stress on the interface between the outer circumference of the adhesive portion of the membrane module and the cover at each of the linear velocities was calculated based on the measured stress value by the strain gauge. The results are shown in FIG. 2. At the linear velocity of 0.1. m/sec., any reduction of the adhesive strength between the outer circumference of the adhesive portion of the membrane module and the cover was not observed even after twenty times of steam sterilization. At velocities of 0.2 to 0.3 m/sec., a reduction of the adhesive strength between the outer circumference of the adhesive portion of the membrane module and the cover was significantly observed after about one to five times of steam sterilization.

The maximum stress on the interface between the outer circumference of the adhesive portion of the membrane module and the cover was calculated based on the following expression:

$$Pa = \frac{\dfrac{2\delta}{2c} + 2\left\{\dfrac{P_m}{E_1}\dfrac{a^2}{(c^2-a^2)} + \dfrac{Pb}{E_2}\dfrac{b^2}{(b^2-c^2)}\right\}}{\left\{\dfrac{m_1-1}{m_1 E_1} + \dfrac{m_2+1}{m_2 E_2}\right\} + 2\left\{\dfrac{1}{E_1}\dfrac{a^2}{(c^2-a^2)} + \dfrac{1}{E_2}\dfrac{c^2}{(b^2-c^2)}\right\}}$$

wherein
  a: radius of the cylinder of the hollow fiber filled portion,
  b: radius of the cylinder including the outer surface of the cover,
  c: radius of the cylinder up to the outer circumference of the adhesive portion,
  Pm: stress on the interface between the outer circumference of the adhesive portion and the cover,
  Pa: stress on the interface between the hollow fiber filled portion and the outer circumference of the adhesive portion,
  Pb: stress on the cover portion,
  δ: interference,
  $E_1$: modulus of longitudinal elasticity or the outer circumference of the adhesive portion,
  $E_2$: modulus of longitudinal elasticity of the cover portion,
  $1/m_1$: Poison ratio of the outer circumference of the adhesive portion, and
  $1/m_2$: Poison ratio of the cover portion.

In the method of cooling a filtration apparatus after steam sterilization according to the invention, the membrane module immediately after steam sterilization is enabled to be cooled without causing the pressure of the filtrated-water side of the membrane module to be negative and producing any possibility that contamination occurs again, by adding only a raw-water low-velocity supplying circuit which supplies raw water of an ordinary temperature at a low velocity to the raw-water side of the filtration apparatus immediately after steam sterilization. Consequently, the scale of the equipment to be added can be made small so that the equipment cost and the installation space are reduced.

Furthermore, the cooling rate of the filtrated-water chamber of the membrane module can be adjusted so as to sufficiently reduce the thermal stress on the adhesion interface of the membrane module. Thus, it is possible to prevent the peeling of the adhesion interface of the membrane module from occurring. In addition, since any gas introduction is not performed, there is no possibility that the membrane is dry-deteriorated by a heated gas. Accordingly, it is possible to repetitively perform the steam sterilization of the membrane module with safety over a long term. In addition, the cooling flows, and hence the cooling can be attained for a shorter time period. This means that a waiting time period which must elapse until the filtration operation is started again can be shortened, and the rate of operation of the filtration apparatus can be increased.

What is claimed is:

1. A method of cooling a filtration apparatus after steam sterilization, comprising the steps of:
  passing raw water at a first linear velocity through said filtration apparatus in which a membrane module is incorporated;
  sending steam into said filtration apparatus to sterilize said filtration apparatus; and passing raw water of an ordinary temperature at a linear velocity which is less than said first linear velocity through said filtration apparatus to cool said filtration apparatus and to exclusively counter a pressure drop therein.

2. The method of cooling a filtration apparatus after steam sterilization according to claim 1, wherein said liner velocity which is less than said first linear velocity is at most 0.1 m/second.

3. The method of cooling a filtration apparatus after steam sterilization according to claim 1, further comprising the steps of:

securing an inlet through which only raw water at said linear velocity which is less than said first linear velocity enters into said filtration apparatus; and securing an outlet through which filtrated water exits from said filtration apparatus.

4. The method of cooling a filtration apparatus after steam sterilization according to claim 1, further comprising the step of:

contacting steam remaining in said filtration apparatus with filtrated water of an ordinary temperature to condense said steam, whereby a pressure reduction of an interior of said membrane module is compensated by a space reduction of said interior of said membrane module which is caused by said filtrated water.

5. The method of cooling a filtration apparatus after steam sterilization according to claim 1, further comprising the step of continuing to supply raw water at said linear velocity which is less than said first linear velocity to keep a flow of filtered water in said membrane module.

* * * * *